(12) United States Patent
Hoshi et al.

(10) Patent No.: US 8,801,405 B2
(45) Date of Patent: Aug. 12, 2014

(54) CENTRIFUGAL PUMP

(75) Inventors: Hideo Hoshi, Tokyo (JP); Syogo Nakashima, Tokyo (JP); Tatsuya Hidaka, Tokyo (JP); Yasuharu Yamamoto, Tokyo (JP); Takeshi Okubo, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 335 days.

(21) Appl. No.: 12/845,000

(22) Filed: Jul. 28, 2010

(65) Prior Publication Data

US 2011/0188996 A1 Aug. 4, 2011

(30) Foreign Application Priority Data

Feb. 2, 2010 (JP) ................................. 2010-021222
Feb. 2, 2010 (JP) ................................. 2010-021223

(51) Int. Cl.
| | | |
|---|---|---|
| F04B 17/00 | (2006.01) | |
| F04B 35/04 | (2006.01) | |
| F01D 5/00 | (2006.01) | |
| F01D 5/22 | (2006.01) | |
| F03D 11/00 | (2006.01) | |
| F01D 3/00 | (2006.01) | |
| F01D 3/04 | (2006.01) | |
| F04D 29/18 | (2006.01) | |
| F04D 29/26 | (2006.01) | |
| F04D 29/44 | (2006.01) | |
| F04D 29/54 | (2006.01) | |

(52) U.S. Cl.
USPC ...... 417/420; 417/423.12; 416/136; 416/182; 415/104; 415/140; 415/203; 415/900

(58) Field of Classification Search
USPC ............. 417/423, 1, 12, 423.4, 420; 415/900, 415/203, 140, 104; 416/136, 182
See application file for complete search history.

(56) References Cited

U.S. PATENT DOCUMENTS 5,399,074 A * 3/1995 Nose et al. ................. 417/423.1
5,658,136 A 8/1997 Mendler
(Continued)

FOREIGN PATENT DOCUMENTS

| EP | 0240674 A2 | 10/1987 |
|---|---|---|
| JP | 4317206 B1 | 7/1968 |
| JP | 62284995 A | 12/1987 |
| JP | 2869886 B2 | 1/1999 |
| JP | 2002-349482 A | 12/2002 |

(Continued)

OTHER PUBLICATIONS

International Search Report for PCT/JP2010/062341 mailed Aug. 17, 2010.

*Primary Examiner* — Devon Kramer
*Assistant Examiner* — Lilya Pekarskaya
(74) *Attorney, Agent, or Firm* — Kanesaka, Berner & Partners

(57) ABSTRACT

A sealless-type centrifugal pump includes a casing that forms a pump chamber having a liquid inflow port and an outflow port, an impeller disposed in the pump chamber and rotatably supported by a pivot bearing, and a magnetic coupling device including a driven permanent magnet built into the impeller and a driving magnet that rotationally drives the driven permanent magnet through a partition. The impeller supported in the direction of the rotation axis with respect to the casing is driven by the magnetic coupling device, and pressure is applied to liquid introduced from the direction of the rotation axis through the inflow port to send the liquid through the outflow port in a radial direction. The magnetic coupling device is disposed on a line inclined from an impeller rotating surface to the inflow port side toward the center of the rotation axis.

6 Claims, 6 Drawing Sheets

(56) References Cited

U.S. PATENT DOCUMENTS

| | | | |
|---|---|---|---|
| 5,713,730 A * | 2/1998 | Nose et al. | 417/423.12 |
| 5,803,720 A * | 9/1998 | Ohara et al. | 417/420 |
| 6,722,863 B2 * | 4/2004 | Maeda et al. | 417/420 |
| 6,884,210 B2 * | 4/2005 | Nose et al. | 600/16 |
| 6,966,748 B2 * | 11/2005 | Woodard et al. | 415/104 |

FOREIGN PATENT DOCUMENTS

| | | | |
|---|---|---|---|
| JP | 2002541986 A | | 12/2002 |
| JP | 2004-144070 | * | 5/2004 |
| JP | 2004144070 A | | 5/2004 |
| WO | 9912587 A1 | | 3/1999 |
| WO | 0064509 A1 | | 11/2000 |

\* cited by examiner

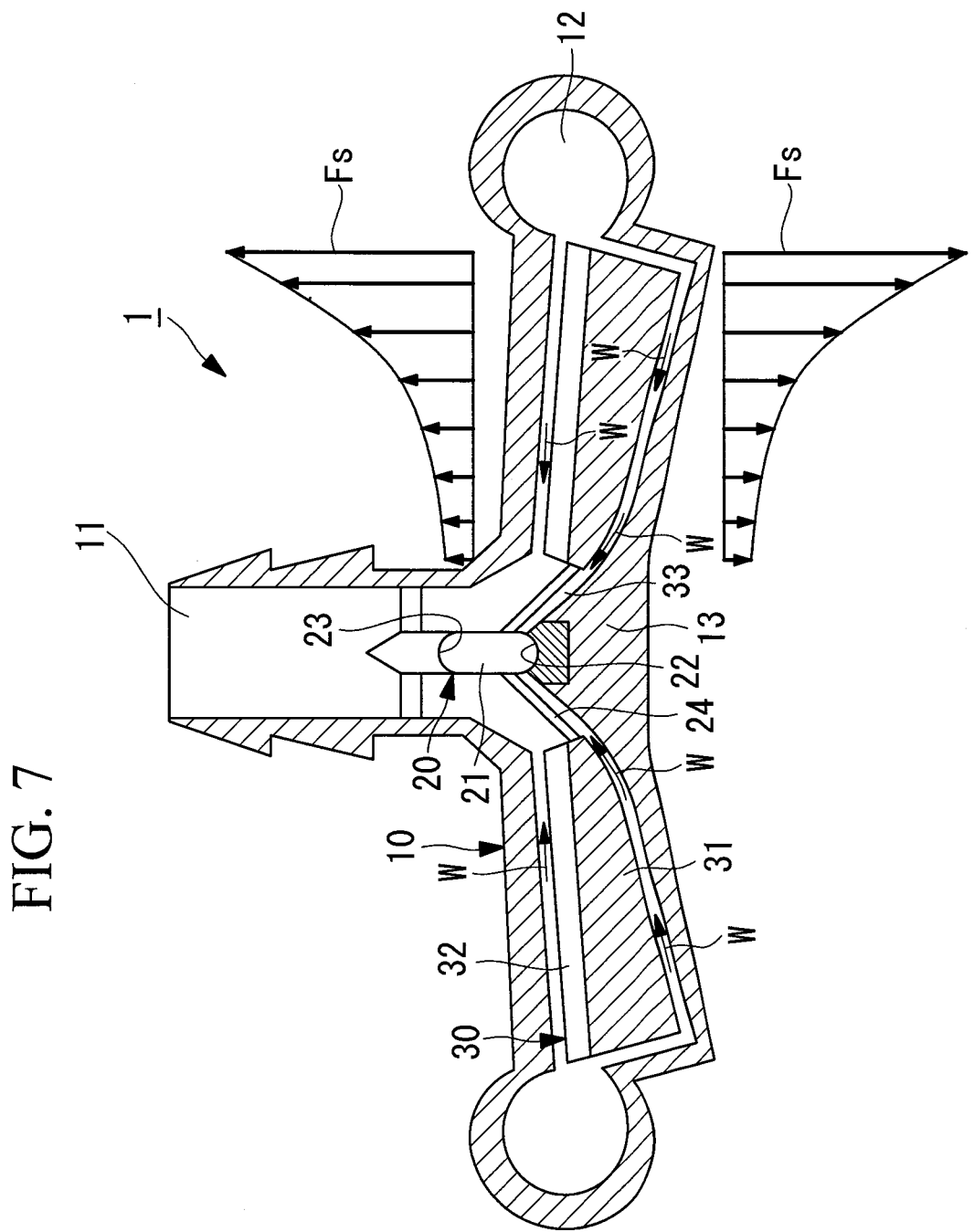

CENTRIFUGAL PUMP

CROSS REFERENCE TO RELATED APPLICATIONS

This application claims benefit of Japanese Applications No. 2010-021222 filed in Japan on Feb. 2, 2010 and No. 2010-021223 filed in Japan on Feb. 2, 2010, the contents of each of which are hereby incorporated by their reference.

BACKGROUND OF THE INVENTION

1. Field of the Invention

The present invention relates to a centrifugal pump that applies pressure by driving an impeller by magnetic coupling, and in particular, to a centrifugal pump suitable for liquid such as chemical solutions containing fine particles, and liquid such as chemical solutions that tend to seize.

2. Description of Related Art

Conventionally, general pumps have a shaft seal mechanism (shaft seal unit) to prevent fluid in a pump chamber from leaking outside from a shaft and to prevent sucking in of air or the like from outside. Practical shaft seal mechanisms include gland packing, labyrinth or mechanical seals, etc., which are selected depending on the pump operating environment, cost, etc.

Some of the pumps described above are centrifugal pumps, which are configured to supply pressure energy or speed energy in a radial direction to fluid using a centrifugal force by rotating an impeller in a casing.

Some of the centrifugal pumps described above rotationally drive a pump rotor which is stabilized by permanent magnets acting in the radial direction on a ferromagnetic area of the pump rotor (for example, refer to JP2869886B2).

A known centrifugal pump is provided with permanent magnets at the shaft of an impeller and rotates the impeller by a driving unit that is provided at the casing side and that generates a rotating magnetic field. In this case, it is disclosed that the impeller is supported by a pivot bearing, and for the materials of the pivot shaft and a pivot bearing, materials with different hardnesses, such as a combination of ceramic and ultra-high-molecular-weight polyethylene, is selected (for example, refer to JP2002-349482A).

Meanwhile, centrifugal pumps equipped with a shaft seal mechanism have problems with the occurrence of leakage from a shaft seal component, the occurrence of wear and friction, and limited heat-resistant temperature and pressure resistance. This requires the development of a centrifugal pump that needs no shaft seal mechanism and also has no leakage.

The present invention is made in consideration of the above-described circumstances, and it is an object thereof to provide a centrifugal pump that needs no shaft seal mechanism and has no leakage. In particular, an object of the present invention is to provide a centrifugal pump with a configuration that is suitable for liquid such as chemical solutions containing fine particles, and liquid such as chemical solutions that tend to seize, and moreover, that can easily be reduced in size.

BRIEF SUMMARY OF THE INVENTION

The present invention is made in consideration of the above-described circumstances, and it is an object thereof to provide a centrifugal pump that needs no shaft seal mechanism and has no leakage. In particular, an object of the present invention is to provide a centrifugal pump with a configuration that is suitable for liquid such as chemical solutions containing fine particles, and liquid such as chemical solutions that tend to seize, and moreover, that can easily be reduced in size.

To solve the problems described above, the present invention adopts the following solutions.

A centrifugal pump according to a first aspect of the present invention is a sealless-type centrifugal pump including a casing that forms a pump chamber having a liquid inflow port and an outflow port, an impeller disposed in the pump chamber and rotatably supported by a pivot bearing, and a magnetic coupling device including a driven permanent magnet built into the impeller and a driving magnet that rotationally drives the driven permanent magnet through a partition, the centrifugal pump being configured such that the impeller supported in the direction of the rotation axis with respect to the casing is driven by the magnetic coupling device, and pressure is applied to liquid introduced from the direction of the rotation axis through the inflow port to send the liquid through the outflow port in a radial direction, wherein the pivot bearing includes a pivot shaft located at the center of the rotation axis of the impeller and a bearing portion, at the casing side, provided at the axial center line of the inflow port; and the magnetic coupling device is disposed on a line inclined from an impeller rotating surface to the inflow port side toward the center of the rotation axis.

With the centrifugal pump according to the first aspect of the present invention, since the pivot bearing includes the pivot shaft located at the center of the rotation axis of the impeller and the bearing portion, at the casing side, provided at the axial center line of the inflow port; and because the magnetic coupling device is disposed on the line inclined from the impeller rotating surface to the inflow port side toward the center of the rotation axis, the magnetic coupling device is disposed in a state in which it is inclined from the impeller rotating surface. Accordingly, thrust depending on the inclination angle acts on the pivot bearing due to the magnetic force of the magnetic coupling; therefore, the pivot shaft is pushed against the bearing portion by the thrust. That is, since the magnetic coupling device is disposed on the line inclined to the inflow port side toward the center of the rotation axis, the magnetic force of the magnetic coupling device is decomposed into a thrust component that pushes the pivot shaft in the direction of the rotation axis and a radial component that acts outward in the direction of the impeller rotating surface, and therefore, the thrust that acts on the pivot bearing stabilizes the rotation of the impeller.

In the centrifugal pump according to the first aspect of the present invention, preferably, at least one of opposing surfaces of the impeller and the casing is subjected to a low-friction process for an area having the possibility of contact in a halted state, which allows the impeller to be smoothly rotated to be started during idle running started from a state in which the pump chamber contains no liquid.

A centrifugal pump according to a second aspect of the present invention is a sealless-type centrifugal pump including a casing that forms a pump chamber having a liquid inflow port and an outflow port, an impeller disposed in the pump chamber and rotatably supported by a pivot bearing, and a magnetic coupling device including a driven permanent magnet built into the impeller and a driving magnet that rotationally drives the driven permanent magnet through a partition, the centrifugal pump being configured such that the impeller supported in the direction of the rotation axis with respect to the casing is driven by the magnetic coupling device, and pressure is applied to liquid introduced from the direction of the rotation axis through the inflow port to send the liquid through the outflow port in a radial direction, wherein the pivot bearing includes a pivot shaft located at the center of the rotation axis of the impeller and two-point supporting bearing portions that support the pivot shaft from both sides on the axial center line of the inflow port; the magnetic coupling device is disposed on a line inclined from an impeller rotating surface to the inflow port side toward the center of the rotation axis; and a through-hole in the direction of the rotation axis is formed at the center of rotation of the impeller.

With the centrifugal pump according to the second aspect of the present invention, since the pivot bearing includes a pivot shaft located at the center of the rotation axis of the impeller and two-point supporting bearing portions that support the pivot shaft from both sides on the axial center line of the inflow port; the magnetic coupling device is disposed on a line inclined from an impeller rotating surface to the inflow port side toward the center of the rotation axis; and a through-hole in the direction of the rotation axis is formed at the center of rotation of the impeller, symmetric secondary flows can be formed on both surfaces of the impeller in the direction of the rotation axis of the impeller, which can therefore balance the axial thrust, thus reducing the load on the pivot bearing.

In the centrifugal pumps according to the first and second aspects of the present invention, preferably, the pivot bearing is such that at least part of the pivot shaft protrudes to the inflow port side relative to the impeller, which allows the pivot bearing disposed at the high-flow-rate inflow port side to be efficiently cooled by the fluid introduced through the inflow port.

According to the present invention described above, since the magnetic coupling device is disposed on the line inclined to the inflow port side toward the center of the rotation axis, so that the magnetic force of the magnetic coupling device generates thrust that pushes the pivot shaft in the direction of the rotation axis, the thrust that acts on the pivot bearing stabilizes the rotation of the impeller, thereby making it possible to easily provide a leak-free compact centrifugal pump without using the shaft seal mechanism.

Alternatively, since the magnetic coupling device is disposed on the line inclined to the inflow port side toward the center of the rotation axis, the impeller is stably supported by the two-point supporting pivot bearing, and the through-hole in the direction of the rotation axis is formed at the center of rotation of the impeller, symmetric secondary flows can be formed on both surfaces of the impeller in the direction of the rotation axis of the impeller. Therefore, the axial thrust that acts on the impeller and the pivot shaft is balanced in the direction of the rotation axis, which can reduce a load that acts on the stable two-point supporting pivot bearing, thereby making it possible to easily provide a leak-free compact centrifugal pump without using the shaft seal mechanism.

Furthermore, the centrifugal pump driven by the magnetic coupling device and having no shaft seal mechanism is suitable for liquid such as chemical solutions containing fine particles, and liquid such as chemical solutions that tend to seize, because it has a structure in which the particles in the liquid are hardly damaged and the liquid is hardly seized.

BRIEF DESCRIPTION OF THE SEVERAL VIEWS OF THE DRAWINGS

FIG. 7 is an explanatory diagram of thrust acting on the pivot shaft and secondary flows that are vertically symmetric with respect to the impeller.

DETAILED DESCRIPTION OF THE INVENTION

Embodiments of a centrifugal pump according to the present invention will be described hereinbelow on the basis of the drawings.

Figure 1:
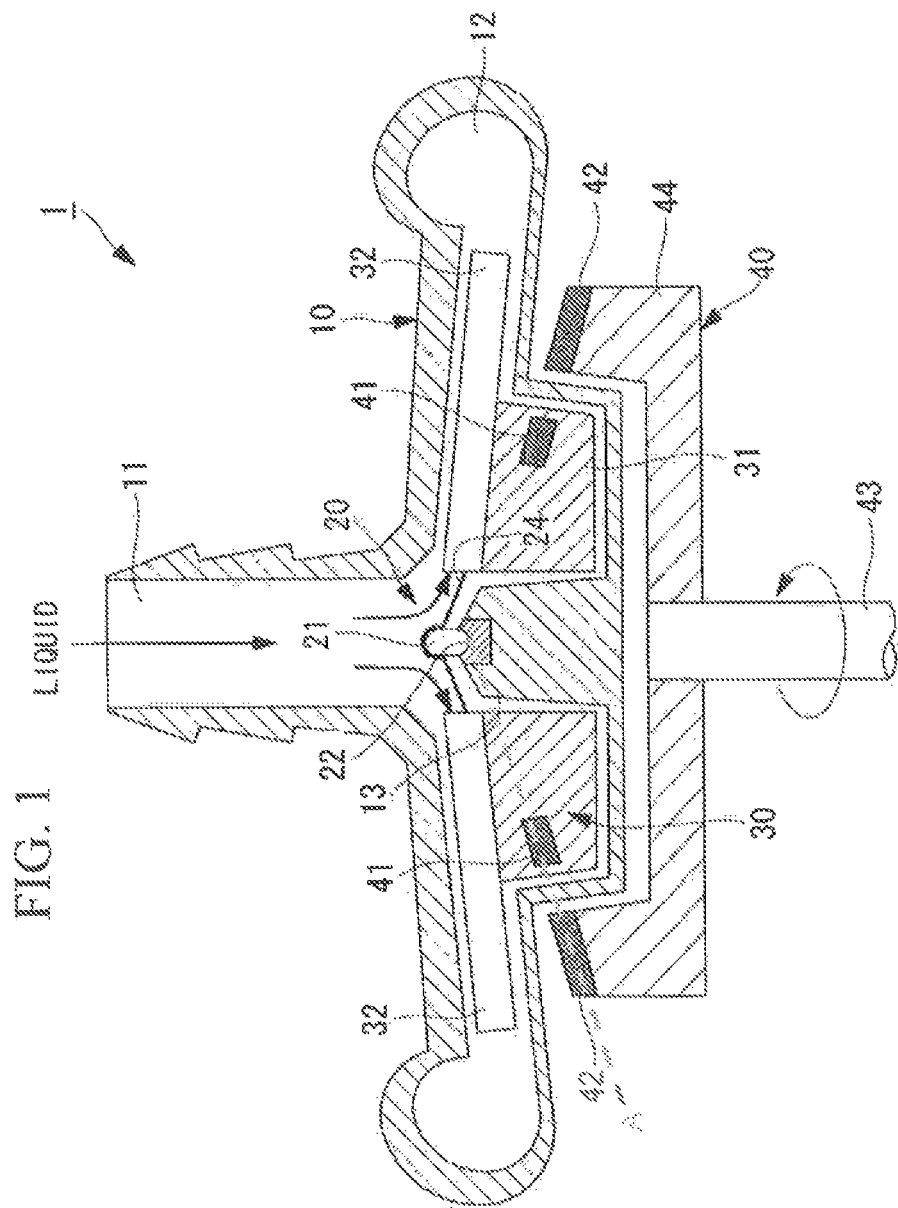
FIG. 1 is a vertical sectional view (vertical sectional view in the direction of the rotation axis) showing an embodiment of a centrifugal pump according to the present invention.

A centrifugal pump 1 of a first embodiment shown in FIG. 1 is equipped with a casing 10 that forms a pump chamber 12 having a liquid inflow port 11 and an outflow port (not shown), an impeller 30 disposed in the pump chamber 12 and rotatably supported by a pivot bearing 20, and a magnetic coupling device 40 including a driven permanent magnet 41 built into the impeller 30 and a driving magnet 42 that rotationally drives the driven permanent magnets 41 through the partition of the casing 10. The driving magnet 42, the driven permanent magnet 41, and the pivot bearing 20 are disposed on a same straight line A.

The casing 10 forms a pump chamber 12 that introduces liquid through an inflow port 11 coaxial with the center of the rotation axis of the impeller 30 and pressurizes the liquid by the rotation of the impeller 30. The liquid pressurized in this pump chamber 12 is sent in the radial direction of the impeller 30 through the outflow port provided in the pump chamber 12. That is, the impeller 30 rotates in the pump chamber 12 of the casing 10 while being supported by the pivot bearing 20 serving as a rotational shaft aligned with the axial center line of the inflow port 11. In the illustrated configuration example, the impeller 30 rotates on a horizontal plane, and the inflow port 11 is disposed on a vertical line perpendicular to the rotating surface (horizontal plane) of the impeller 30 and above the impeller rotating surface.

The pivot bearing 20 is equipped with a pivot shaft 21 located at the center of the rotation axis of the impeller 30 and a casing-10-side bearing portion 22 provided on the axial center line of the inflow port 11.

The pivot shaft 21 fixedly supported at the impeller 30 side via a support member 24 employs a material with low-friction performance and excellent water lubrication performance and corrosion resistance, such as alumina ceramic or a titanium carbonitride alloy. In the impeller 30 in this case, the pivot shaft 21 and the impeller 30 are joined by the support member 24.

On the other hand, the bearing portion 22 fixedly supported at the casing 10 side employs a material with low-friction properties and excellent abrasion resistance, such as ultra-high-molecular-weight polyethylene, fluorocarbon polymers, such as polytetrafluoroethylene (PTFE), and polyetheretherketone (PEEK) polymer materials.

Furthermore, the pivot bearing 20 has a structure in which the bearing portion 22 having a concave curved surface rotatably supports the pivot shaft 21 having a convex curved surface with substantially the same shape, and the illustrated configuration example is configured such that the bearing portion 22 supports, on the rotation axis of the impeller 30, one point of the lower surface of the pivot shaft 21. The bearing portion 22 in this case is fixedly supported by a bearing support 13 provided on the casing 10.

The bearing support 13 is a portion of the inner surface of the casing 10, protruding toward the inflow port 11 side on the rotation axis of the impeller 30 to a position at which the bearing support 13 substantially passes through the center of the impeller 30.

The impeller 30 is configured such that a plurality of blades 32 are mounted to an impeller main body 31. In the illustrated configuration example, the plurality of blades 32 are mounted in a radiating pattern in the radial direction on the inflow-port-side end surface of the substantially hollow cylindrical impeller main body 31.

The thus-configured impeller 30 is supported in the direction of the rotation axis with respect to the casing 10 via the pivot bearing 20 and is supported so as to be rotatable about the rotation axis by the driving force of the magnetic coupling device 40 to be described below.

The magnetic coupling device 40 includes the driven permanent magnet 41 built into the impeller 30 and the driving magnet 42 that rotates around the periphery of the casing 10. As a magnet suitable for the driven permanent magnet 41 and the driving magnet 42, for example, a neodymium magnet known as being the strongest is effective in reducing the size of the centrifugal pump 1.

In the illustrated configuration example, a plurality of the driven permanent magnets 41 are embedded in the impeller main body 31 at a regular pitch in the circumferential direction.

A plurality of the driving magnets 42 are fixed to a rotor 44 that rotates together with a rotational shaft 43 joined to a driving source (not shown) at a regular pitch in the circumferential direction.

The driven permanent magnets 41 and the driving magnets 42 of the magnetic coupling device 40 in this embodiment are disposed on a line inclined from the impeller rotating surface to the inflow port 11 side toward the center of the rotation axis of the impeller 30. That is, the driven permanent magnets 41 and the driving magnets 42 of the magnetic coupling device 40 are inclined from the rotating surface of the impeller 30. In other words, the magnetic coupling device 40 is configured such that the driven permanent magnets 41 and the driving magnets 42 are disposed on the line inclined from the impeller rotating surface to the inflow port 11 side; therefore, magnetic force acting between the magnets 41 and 42 in a direction in which they attract each other is generated from the driving magnets 42 toward the center of the rotation axis in the direction inclined from the impeller rotating surface to the inflow port 11 side (inclined from a line perpendicular to the center of the rotation axis), for example, indicated by arrow f in FIG. 2.

In the thus-configured centrifugal pump 1, the impeller 30 is entrained to rotate as the driven permanent magnets 41 are attracted to the driving magnets 42 by driving the magnetic coupling device 40, that is, by rotating the driving magnets 42 together with the rotor 44. This allows the magnetic coupling 40 to rotationally drive the impeller 30 through the partition of the casing 10, and as a result, the liquid introduced through the inflow port 11 in the direction of the rotation axis is pressurized by the impeller 30 and flows out from the outflow port in the radial direction.

Figure 2:
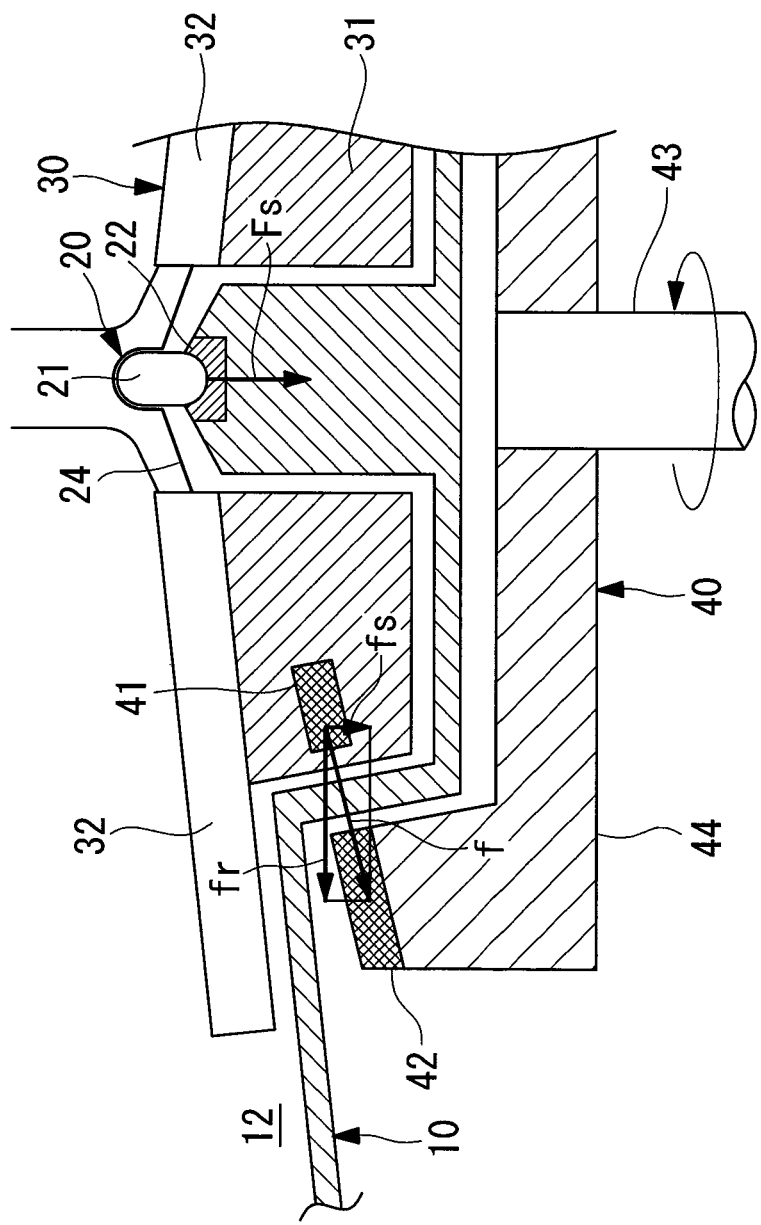
FIG. 2 is an exploded view of magnetic force generated from a magnetic coupling device and an explanatory diagram illustrating thrust acting on a pivot shaft.

Since the magnetic coupling device 40 is disposed on the line inclined from the impeller rotating surface to the inflow port 11 side toward the center of the rotation axis, thrust Fs depending on the inclination angle acts on the pivot bearing 20, as indicated by arrow Fs in FIG. 2, due to magnetic force f between the driven permanent magnets 41 and the driving magnets 42 that attracts them towards each other constituting a magnetic coupling. The thrust Fs in this case is the sum of the rotation-axis components (thrust components indicated by arrow fs) of magnetic force f by which a plurality of pairs of the driven permanent magnets 41 and driving magnets 42 attract each other.

That is, the magnetic force f between the driven permanent magnets 41 and the driving magnets 42 acts in the direction inclined relative to the center of the rotation axis and the impeller rotating surface because the magnetic coupling device 40 is inclined.

Therefore, the magnetic force f is decomposed into a component in a thrust direction (thrust component) fs that pushes the pivot shaft 21 to the bearing portion 22 in the direction of the rotation axis and a component in a radial direction (radial component) fr that acts outward in the direction of the impeller rotating surface depending on the inclination angle of the magnetic force f, and therefore, the thrust Fs that acts on the pivot bearing 20 is the sum of the thrust components fs corresponding to the number of the driven permanent magnets 41 and the driving magnets 42 that generate the magnetic force f.

Since the thrust Fs that pushes the pivot shaft 21 against the bearing portion 22 is always thus exerted while the impeller 30 is rotating, the impeller 30 supported by the pivot bearing 20 can stably rotate by receiving the pushing force of the thrust Fs.

That is, since the magnetic coupling device 40 is disposed on the line inclined toward the center of the rotation axis and extending to the inflow port side, the pivot bearing 20 that needs no shaft seal mechanism can be employed, and the liquid can be pressurized by the stable rotation of the impeller 30. In other words, since the magnetic coupling device 40 is disposed on the line inclined to the inflow port 11 side toward the center of the rotation axis, so that the magnetic force of the magnetic coupling device 40 generates the thrust Fs that pushes the pivot shaft 21 in the direction of the rotation axis, the thrust Fs that acts on the pivot bearing 20 stabilizes the rotation of the impeller 30, thereby making it possible to easily provide the leak-free centrifugal pump 1 without using the conventional shaft seal mechanism.

Furthermore, since the centrifugal pump 1 of the first embodiment described above is configured such that the impeller 30 is supported at one point by the pivot bearing 20, there is a risk of the rotating impeller 30 getting out of balance due to some external force or the like, thus becoming inclined.

However, in the centrifugal pump 1 of this embodiment, even if the impeller 30 is inclined, a restoring force that tends to correct the inclination to bring back the impeller 30 to its normal position acts due to the magnetic force of the magnetic coupling device 40. Therefore, even if the impeller 30 is inclined during operation, the restoring force acts immediately to bring back the impeller 30 to the normal position, which can therefore prevent the impeller 30 from interfering with the casing 10.

Figure 3:
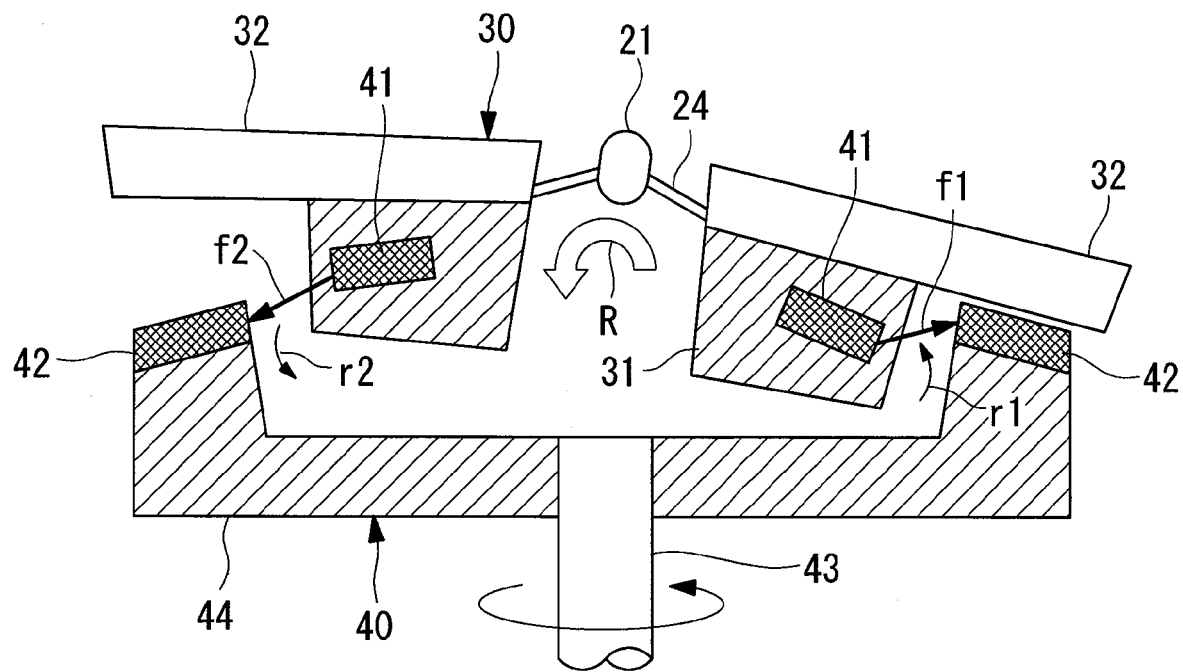
FIG. 3 is an explanatory diagram of a restoring force that acts on the magnetic coupling device when the impeller is inclined.

FIG. 3 is an explanatory diagram of the restoring force that acts on the impeller 30 due to the magnetic force of the magnetic coupling 40; if the impeller 30 inclines to the right side on the plane of the drawing as illustrated, a counterclockwise restoring force indicated by open arrow R acts on the impeller 30. FIG. 3 is a schematic diagram describing the restoring force, in which components, such as the casing 10, are omitted.

This restoring force R is such that a counterclockwise rotational force acts because the driven permanent magnet 41 located lower than the driving magnet 42 is brought up (in the direction of arrow r1) due to magnetic force f1 at the right side of the impeller 30 inclined downward, and at the same time, the driven permanent magnet 41 located higher than the driving magnet 42 is brought down (in the direction of arrow r2) due to magnetic force f2 at the left side of the impeller 30 inclined upward.

Furthermore, the pivot bearing 20 of the centrifugal pump 1 described above is preferably disposed at a position at which at least part of the pivot shaft 21 protrudes toward the inflow port 11 side relative to the impeller 30. In the pump chamber 12, the position at which the part protrudes toward the inflow port 11 side relative to the impeller 30 is an area serving as a channel through which the main flow of the liquid introduced into the pump chamber 12 through the inflow port 11 passes constantly, and is therefore an area in which the flow rate of the liquid is high.

Therefore, since the pivot bearing 20 disposed in the area in which the flow rate of the liquid introduced into the pump chamber 12 is high can be subjected to an accelerated cooling effect due to contact with the liquid that is pressurized by the centrifugal pump 1, frictional heat generated on the sliding surface of the pivot bearing 20 is efficiently absorbed, thereby suppressing an increase in temperature. That is, the pivot bearing 20 disposed at the inflow port 11 side at which the flow rate is high can efficiently be cooled by the flow of fluid introduced through the inflow port 11, which can therefore suppress an increase in the temperature of the pivot bearing 20, thereby improving the durability of the pivot bearing 20 and the centrifugal pump 1.

Regarding the position of the pivot bearing 20, the whole of the pivot bearing 20 may be disposed in the area in which the liquid flow rate is high in consideration of only the cooling effect; however, for example, a practical optimum position may be selected in consideration of conditions necessary for supporting the stable rotation of the impeller 30.

Figure 4:
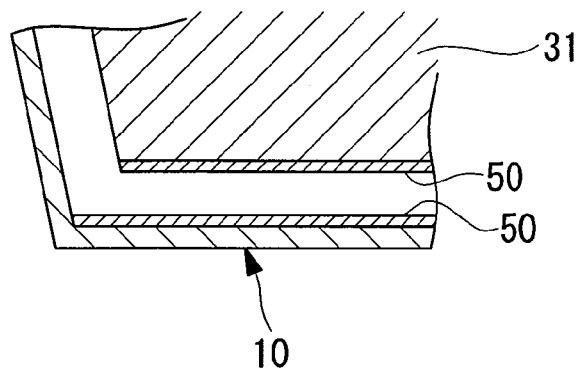
FIG. 4 is an enlarged view of a relevant part illustrating a configuration example of a low-friction process performed on the opposing surfaces of the impeller and the casing.

Furthermore, preferably, the centrifugal pump 1 of the first embodiment described above is subjected to a bottom-friction process of forming low-friction processing layers 50 on the opposing surfaces of the impeller 30 and the casing 10, as shown in FIG. 4, for example.

A preferred concrete example of the low-friction processing layer 50 is a carbon-fluoride polymer layer, such as a polytetrafluoroethylene (PTFE) sheet layer, formed on the surface. The polytetrafluoroethylene is a chemically stable fluorocarbon polymer, which is a substance having excellent heat resistance and chemical resistance and a low friction coefficient.

Such a low-friction processing layer 50 may be formed on at least one of the surfaces in an area having the possibility of contact in a halted state, that is, the surfaces at which the impeller 30 that is inclined due to one point support by the pivot bearing 20 while the operation is halted comes into contact with the casing 10. In the embodiment shown in FIG. 4, although the low-friction processing layer 50 is formed on both the lower surface of the impeller main body 31 and the bottom surface of the casing 10 facing the lower surface of the impeller main body 31, either one of them is possible.

Performing such a low-friction process allows the impeller 30 to be smoothly rotated to start the centrifugal pump 1 particularly during idle running started from a state in which the pump chamber 12 contains no liquid.

Since the centrifugal pump 1 of the first embodiment described above is configured such that the magnetic coupling device 40 is disposed on the line inclined to the inflow port 11 side toward the center of the rotation axis, so that the magnetic force of the magnetic coupling device 40 generates the thrust Fs that pushes the pivot shaft 21 in the direction of the rotation axis, the thrust Fs that acts on the pivot bearing 20 stabilizes the rotation of the impeller 30, thereby making it possible to easily provide the leak-free compact centrifugal pump 1 without using the shaft seal mechanism.

Furthermore, with the centrifugal pump 1 driven by the magnetic coupling device 40 and having no shaft seal mechanism, a pump suitable for pressurizing liquid such as chemical solutions containing fine particles (fluid mixture), and liquid such as chemical solutions that tend to seize can be achieved because there is no shaft seal mechanism that may cause damage to the fine particles in the liquid or cause seizing of the liquid.

Furthermore, the volute shape of the pump chamber 12 is preferably a double volute shape to reduce a radial load on the pivot bearing 20. This is because if the volute portion of the pump chamber 12 is a single volute, a heavy radial load is imposed when the centrifugal pump 1 is operated out of a design point although a low radial load is imposed in the vicinity of the design point.

Furthermore, the impeller 30 is preferably a closed impeller to reduce a thrust load on the pivot bearing 20.

Figure 5A:
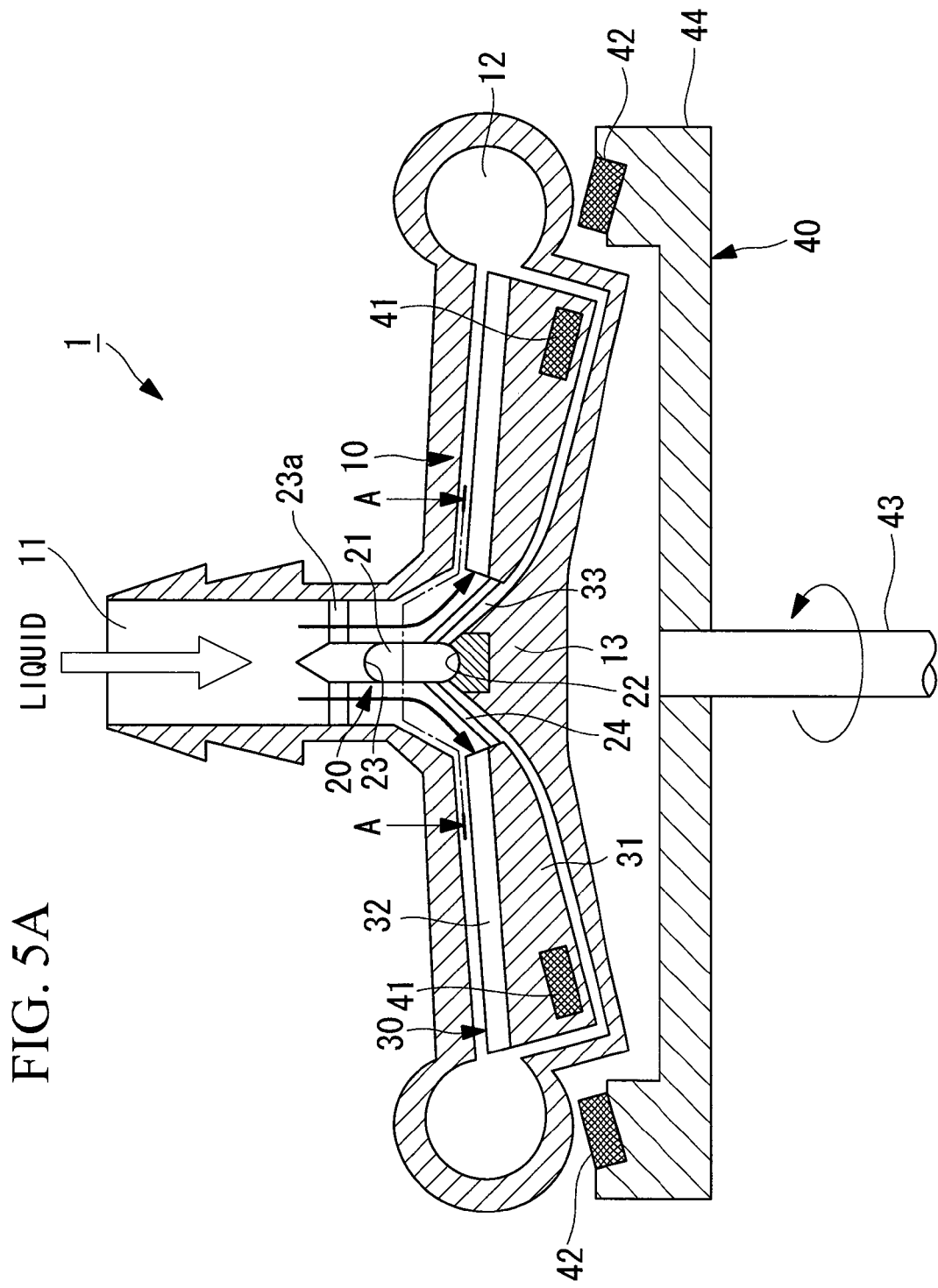
FIG. 5A is a vertical sectional view (vertical sectional view in the direction of the rotation axis) showing an embodiment of a centrifugal pump according to the present invention.
Figure 5B:
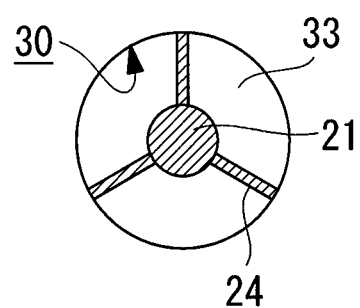
FIG. 5B is a cross-sectional view taken along line A-A in FIG. 5A.
Figure 6:
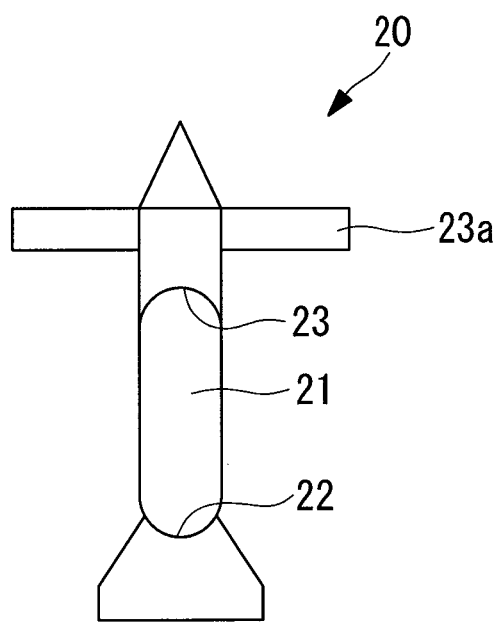
FIG. 6 is an enlarged view of the pivot bearing in FIG. 5A.

Like the centrifugal pump 1 of the first embodiment, a centrifugal pump 1 of a second embodiment shown in FIGS. 5A and 5B is equipped with a casing 10 that forms a pump chamber 12 having a liquid inflow port 11 and an outflow port (not shown), an impeller 30 disposed in the pump chamber 12 and rotatably supported by a pivot bearing 20, and a magnetic coupling device 40 including a driven permanent magnet 41 built into the impeller 30 and a driving magnet 42 that rotationally drives the driven permanent magnets 41 through the partition of the casing 10.

The casing 10 forms a pump chamber 12 that introduces liquid through an inflow port 11 coaxial with the center of the rotation axis of the impeller 30 and pressurizes the liquid by the rotation of the impeller 30. The liquid pressurized in the pump chamber 12 is sent in the radial direction of the impeller 30 through the outflow port provided in the pump chamber 12. That is, the impeller 30 rotates in the pump chamber 12 of the casing 10 while being supported by the pivot bearing 20 serving as a rotational shaft aligned with the axial center line of the inflow port 11. In the illustrated configuration example, the impeller 30 rotates on a horizontal plane, and the inflow port 11 is disposed on a vertical line perpendicular to the rotating surface (horizontal plane) of the impeller 30 and above the impeller rotating surface.

The pivot bearing 20 includes a pivot shaft 21 located at the center of the rotation axis of the impeller 30 and two-point supporting bearing portions 22 and 23 that support the pivot shaft 21 from both sides on the axial center line of the inflow port 11. Both of the pair of bearing portions 22 and 23 are fixedly supported at the casing 10 side.

The pivot shaft 21 fixedly supported at the impeller 30 side via a support member 24 employs a material with low-friction performance and excellent water lubrication performance and corrosion resistance, such as alumina ceramic or a titanium carbonitride alloy.

On the other hand, the bearing portions 22 and 23 fixedly supported at the casing 10 side employ a material with low-friction properties and excellent abrasion resistance, such as ultra-high-molecular-weight polyethylene, fluorocarbon polymers, such as polytetrafluoroethylene (PTFE), and polyetheretherketone (PEEK) plastic materials.

Furthermore, the pivot bearing 20 is configured such that the bearing portions 22 and 23 having concave curved surfaces rotatably support the pivot shaft 21 having convex curved surfaces with substantially the same shape. That is, in the illustrated configuration example, the pivot shaft 20 with a stable two-point support structure is achieved since the bearing portion 22 supports the lower surface of the pivot shaft 21 and the bearing portion 23 supports the upper surface of the pivot shaft 21 on the rotation axis of the impeller 30. In this case, one bearing portion 22 is fixedly supported by the bearing support 13 provided at the casing 10, and the other bearing portion 23 is fixedly supported by the inner peripheral surface of the inflow port 11 via a support member 23*a*.

The bearing support 13 is a portion of the inner surface of the casing 10, protruding toward the inflow port 11 on the rotation axis of the impeller 30 and is provided so as to substantially pass through a through-hole 33 in the direction of the rotation axis formed at the center of rotation of the impeller 30. The bearing support 13 in this case changes its direction while drawing a smooth curve from the direction of the rotation axis (inflow port 11) toward the radial direction of the impeller 30.

The impeller 30 is such that a plurality of blades 32 are mounted to an impeller main body 31. In the illustrated configuration example, the plurality of blades 32 are mounted in a radiating pattern in the radial direction on the inflow-port-side surface of the substantially hollow cylindrical impeller main body 31. Furthermore, the through-hole 33 provided at the axial center of the impeller 30 is provided with a plurality of support members 24 in a radiating pattern that join the pivot shaft 21 and the impeller 30. In the illustrated configuration example, three support members 24 are provided substantially at 120° pitch, between which three through-holes 33 are formed; however, it is not limited thereto.

The thus-configured impeller 30 is supported in the direction of the rotation axis with respect to the casing 10 via the pivot bearing 20 and is supported so as to be rotatable about the rotation axis by the driving force of the magnetic coupling device 40 to be described below.

The magnetic coupling device 40 includes the driven permanent magnet 41 built into the impeller 30 and the driving magnet 42 that rotates around the periphery of the casing 10. As a magnet suitable for the driven permanent magnet 41 and the driving magnet 42, for example, a neodymium magnet known as being the strongest is effective in reducing the size of the centrifugal pump 1.

In the illustrated configuration example, a plurality of the driven permanent magnets 41 are embedded in the impeller main body 31 at a regular pitch in the circumferential direction.

A plurality of the driving magnets 42 are fixed to a rotor 44 that rotates together with a rotational shaft 43 joined to a driving source (not shown) at a regular pitch in the circumferential direction.

The driven permanent magnets 41 and the driving magnets 42 of the magnetic coupling device 40 in this embodiment are disposed on a line inclined from the impeller rotating surface to the inflow port 11 side toward the center of the rotation axis of the impeller 30. That is, the driven permanent magnets 41 and the driving magnets 42 of the magnetic coupling device 40 are inclined from the rotating surface of the impeller 30, and the magnetic forces of the driven permanent magnets 41 and the driving magnets 42 act in a direction in which they pull each other on the line inclined from the impeller rotating surface to the inflow port 11 side.

In the thus-configured centrifugal pump 1, the impeller 30 is rotated as the driven permanent magnets 41 are attracted to the driving magnets 42 by driving the magnetic coupling device 40, that is, by rotating the driving magnets 42 together with the rotor 44. This allows the magnetic coupling 40 to rotationally drive the impeller 30 through the partition of the casing 10, and as a result, the liquid introduced through the inflow port 11 from the rotation axis is pressurized by the impeller 30 and flows out from the outflow port in the radial direction.

Since the thus-configured centrifugal pump 1 is configured such that the pivot bearing 20 includes the pivot shaft 21 located at the center of the rotation axis of the impeller 30 and the two-point supporting bearing portions 22 and 23 that support the pivot shaft 21 from both sides on the axial center line of the inflow port 11, the magnetic coupling device 40 is disposed on the line inclined from the impeller rotating surface to the inflow port 11 side toward the center of the rotation axis, and the through-holes 33 in the direction of the rotation axis are formed about the center of rotation of the impeller 30, symmetric secondary flows (see arrows W in the drawing) are formed on both surfaces of the impeller 30 in the direction of the rotation axis of the impeller 30, as shown in FIG. 7, for example.

In this case, both the surfaces of the impeller 30 are upper and lower surfaces facing the inner surface of the pump chamber 12 in the direction of the rotation axis, which are also surfaces forming the air gap (clearance) of the impeller 30.

Since the through-holes 33 described above are provided, vertically symmetric secondary flows that flow in the direction of the rotation axis through the air gap can be formed on the upper and lower surfaces of the impeller 30, which can balance the axial thrust Fs that acts in vertically opposite directions, thus reducing the load on the pivot bearing 20. In this case, since the support members 24 have a shape that allows a smooth change in direction, these support members 24 further accelerate formation of the vertically symmetric secondary flows.

Furthermore, the pivot bearing 20 of the centrifugal pump 1 described above is preferably disposed at a position at which at least part of the pivot shaft 21 protrudes toward the inflow port 11 side relative to the impeller 30. In the pump chamber 12, the position at which the part protrudes toward the inflow port 11 side relative to the impeller 30 is an area serving as a channel through which the mainstream of the liquid introduced into the pump chamber 12 through the inflow port 11 passes constantly, and is therefore an area in which the flow rate of the liquid is high.

Therefore, since the pivot bearing 20 disposed in the area in which the flow rate of the liquid introduced into the pump chamber 12 is high can be subjected to an accelerated cooling effect due to contact with the liquid that is pressurized by the centrifugal pump 1, frictional heat generated on the sliding surface of the pivot bearing 20 is efficiently absorbed, thereby suppressing an increase in temperature. That is, the pivot bearing 20 disposed at the inflow port 11 side at which the flow rate is high can efficiently be cooled by the flow of fluid introduced through the inflow port 11, which can therefore suppress an increase in the temperature of the pivot bearing 20, thereby improving the durability of the pivot bearing 20 and the centrifugal pump 1.

Regarding the position of the pivot bearing 20, the whole of the pivot bearing 20 may be disposed in the area in which the liquid flow rate is high, that is, an area higher than the impeller 30 (close to the inflow port 11) in consideration of only the cooling effect; however, for example, a practical optimum position may be selected in consideration of conditions necessary for supporting the stable rotation of the impeller 30.

Since the centrifugal pump 1 of the second embodiment described above is configured such that the magnetic coupling device 40 is disposed on the line inclined to the inflow port side toward the center of the rotation axis, the impeller 30 is stably supported by the two-point supporting pivot bearing 20, and the through-holes 33 in the direction of the rotation axis are formed about the center of rotation of the impeller 30, the axial thrusts that act on the impeller 30 and the pivot shaft 20 are balanced in the direction of the rotation axis, that is, the vertical thrusts cancel each other to be almost entirely ineffective. As a result, this can reduce a load that acts on the stable two-point supporting pivot bearing 20, thereby easily providing the compact centrifugal pump 1 that is free from leakage without using the conventional shaft seal mechanism.

Furthermore, with the centrifugal pump 1 driven by the magnetic coupling device 40 and having no shaft seal mechanism, a pump suitable for pressurizing liquid such as chemical solutions containing fine particles (fluid mixture) and liquid such as chemical solutions that tend to seize can be achieved because there is no shaft seal mechanism that may cause damage to the fine particles in the liquid or cause seizing of the liquid.

Furthermore, the blades 32 of the impeller 30 preferably have a double volute shape to reduce a radial load on the pivot bearing 20. This is because, with single volute blades 32, a heavy radial load is imposed when the centrifugal pump 1 is operated away from a design point although a low radial load is imposed in the vicinity of the design point.

Furthermore, the volute shape of the pump chamber 12 is preferably a double volute shape to reduce the radial load on the pivot bearing 20.

The present invention is not limited to the foregoing embodiments, and various modifications may be made without departing from the spirit thereof.

What is claimed is:

1. A sealless-type centrifugal pump including:
a casing that forms a pump chamber having a liquid inflow port and an outflow port,
an impeller disposed in the pump chamber and rotatably supported by a pivot bearing, and
a magnetic coupling device including
a driven permanent magnet built into the impeller, and
a driving magnet configured to rotate an outer periphery of the driven permanent magnet so as to rotationally drive the driven permanent magnet through a partition and disposed at an outer periphery of an impeller main body of the impeller in a radial direction, the centrifugal pump being configured such that the impeller supported in the direction of the rotation axis with respect to the casing is driven by the magnetic coupling device, and pressure is applied to liquid introduced from the direction of the rotation axis through the inflow port to send the liquid through the outflow port in a radial direction,
wherein
the pivot bearing includes a pivot shaft located at the center of the rotation axis of the impeller and a bearing portion, at the casing side, provided at the axial center line of the inflow port,
the driven permanent magnet and the driving magnet are disposed on a line inclined from an impeller rotating surface to the inflow port side toward the center of the rotation axis,
the driving magnet, the driven permanent magnet, and the pivot bearing are disposed on a same straight line and configured to generate a magnetic force acting between the driving magnet and the driven permanent magnet from the driving magnet toward the center of the rotation axis in a direction inclined from a line perpendicular to the center of the rotation axis,
at least an upper end of the pivot shaft protrudes toward the inflow port side and extends beyond an upper surface of the impeller, and
a lower end of the pivot shaft, the driving magnet and the driven permanent magnet are disposed at the same straight line.

2. The centrifugal pump according to claim 1, wherein at least one of opposing surfaces of the impeller and the casing is subjected to a low-friction process for an area having the possibility of contact in a halted state.

3. The centrifugal pump according to claim 1, wherein
the impeller further comprises a lower surface opposite to the upper surface of the impeller, and
at least one of the lower surface of the impeller and a surface of the casing facing the lower surface of the impeller includes a low-friction processing layer.

4. A sealless-type centrifugal pump including:
a casing that forms a pump chamber having a liquid inflow port and an outflow port,
an impeller disposed in the pump chamber and rotatably supported by a pivot bearing, and
a magnetic coupling device including
a driven permanent magnet built into the impeller, and
a driving magnet configured to rotate an outer periphery of the driven permanent magnet so as to rotationally drive the driven permanent magnet through a partition and disposed at an outer periphery of an impeller main body of the impeller in a radial direction, the centrifugal pump being configured such that the impeller supported in the direction of the rotation axis with respect to the casing is driven by the magnetic coupling device, and pressure is applied to liquid introduced from the direction of the rotation axis through the inflow port to send the liquid through the outflow port in a radial direction,
wherein
the pivot bearing includes a pivot shaft located at the center of the rotation axis of the impeller and two-point supporting bearing portions that support the pivot shaft from both sides on the axial center line of the inflow port,
the driven permanent magnet and the driving magnet are disposed on a line inclined from an impeller rotating surface to the inflow port side toward the center of the rotation axis,
the driving magnet, the driven permanent magnet, and the pivot bearing are disposed on a same straight line and configured to generate a magnetic force acting between the driving magnet and the driven permanent magnet from the driving magnet toward the center of the rotation axis in a direction inclined from a line perpendicular to the center of the rotation axis,
a through-hole in the direction of the rotation axis is formed at the center of rotation of the impeller,
at least an upper end of the pivot shaft protrudes toward the inflow port side and extends beyond an upper surface of the impeller, and
a lower end of the pivot shaft, the driving magnet and the driven permanent magnet are disposed at the same straight line.

5. The centrifugal pump according to claim 4, wherein the two-point supporting bearing portions comprise a first bearing portion fixedly supported by the casing, and a second bearing portion fixedly supported by an inner peripheral surface of the inflow port.

6. The centrifugal pump according to claim 5, wherein the first and second bearing portions have concave curved surfaces configured to rotatably support the pivot shaft having convex curved surfaces.

* * * * *